United States Patent [19]
De Filippo

[11] Patent Number: 6,068,337
[45] Date of Patent: May 30, 2000

[54] HEADREST FOR MOTOR-VEHICLE SEATS

[75] Inventor: Emilio De Filippo, Bruzolo, Italy

[73] Assignee: Gestind M.B. Manifattura di Bruzolo S.p.A., Bruzolo, Italy

[21] Appl. No.: 09/191,530

[22] Filed: Nov. 13, 1998

[30] Foreign Application Priority Data

Nov. 14, 1997 [EP] European Pat. Off. ............. 97830596

[51] Int. Cl.[7] ................................................ A47C 7/36
[52] U.S. Cl. .......................... 297/391; 297/404; 297/410
[58] Field of Search .................................. 297/391, 404, 297/410

[56] References Cited

U.S. PATENT DOCUMENTS

| | | | |
|---|---|---|---|
| 3,563,602 | 2/1971 | Ohta | 297/410 |
| 4,411,470 | 10/1983 | Nishimura et al. | 297/410 |
| 4,483,565 | 11/1984 | Terui et al. | 297/410 |
| 5,433,508 | 7/1995 | Akima et al. | 297/410 |
| 5,529,379 | 6/1996 | Stocker | 297/410 |
| 5,713,635 | 2/1998 | De Filippo | 297/410 |
| 5,816,658 | 10/1998 | Wallis | 297/410 |
| 5,823,623 | 10/1998 | Beck | 297/410 |
| 5,860,703 | 1/1999 | Courtois et al. | 297/410 |
| 5,895,094 | 4/1999 | Mori et al. | 297/410 |

FOREIGN PATENT DOCUMENTS

| | | | |
|---|---|---|---|
| 24 26 728 | 12/1975 | Germany | 297/410 |
| 3422-697 | 12/1985 | Germany | 297/391 |

*Primary Examiner*—Peter M. Cuomo
*Assistant Examiner*—Rodney B. White
*Attorney, Agent, or Firm*—Shlesinger, Arkwright & Garvey LLP

[57] ABSTRACT

Headrest for motor-vehicle seats in which the positioning notches of the support rods cooperate with a pair of arms carried by a slider member movable in the load-bearing framework of the headrest, in a direction perpendicular to the support rods, between an engaged position and a disengaged position. Displacement to the disengaged position is operated by at least one push-button provided at one side of the headrest.

9 Claims, 5 Drawing Sheets

HEADREST FOR MOTOR-VEHICLE SEATS

BACKGROUND OF THE INVENTION

The present invention is related to headrests for motor-vehicle seats, comprising a yielding body incorporating a load-bearing framework, a pair of parallel support rods slidably coupled with said load-bearing framework and projecting outside of the yielding body, locking means adapted to engage corresponding positioning notches of the support rods to prevent relative displacement between said support rods and said load-bearing framework, and manually operable release means of said locking means.

In the known headrests of the above-referenced type the locking means and the release means, through which in use the height position of the headrest can be adjusted relative to the backrest of a motor-vehicle seat, are generally designed and arranged so as manual operation of these release means is often uncomfortable and inconvenient.

SUMMARY OF THE INVENTION

The object of the present invention is to overcome the above drawback in a simple, practical and functional way.

A further object of the present invention is to provide a headrest of the above-referenced type whose locking means and release means have a high degree of functional efficiency as well as of operative safety.

According to the invention, these objects are achieved by a headrest for motor-vehicle seats of the type set forth at the beginning, the primary feature of which consists of that:

- the locking means include a pair of arms arranged transversally of the support rods, a slider member carrying said arms and movable in said load-bearing framework in a direction perpendicular to said support rods and to said arms between an engaged position and a disengaged position of said arms relative to said positioning notches of the support rods, and resilient thrust means urging said slider member towards the engaged position,
- the release means comprise at least one push-button arranged at one side of the yielding body and operable from outside to displace said slider member from said engaged position towards said disengaged position, against the action of said resilient thrust means.

According to a preferred embodiment of the invention said resilient thrust means are formed in one piece with said locking arms. More particularly, the resilient thrust means comprise a pair of wire springs having a first branch reacting against the load-bearing framework of the headrest and a second branch constituting the corresponding locking arm.

Moreover the slider member may be conveniently formed with a pair of resilient stop teeth provided to prevent full withdrawal of said support rods relative to the load-bearing framework of the headrest.

The slider member may be formed in one piece, and accordingly the headrest shall be provided with a single release push-button, or alternatively the slider member may be formed by two distinct portions, mutually movable relative to each other, and each of which is connected to a respective push-button arranged on one and on the other side, respectively, of the yielding body of the headrest. In this case the two slider portions are connected to each other by a reversing mechanism, whereby a displacement of one slider portion in one direction, operated through the related push-button, corresponds to a same displacement of the other slider portion in the opposite direction.

This solution affords the advantage to make the headrest according to the invention indifferently utilizable for both right and left motor-vehicle seats.

BRIEF DESCRIPTION OF THE DRAWINGS

The invention will now be disclosed in detail with reference to the accompanying drawings, purely provided by way of non limiting example, in which.

DETAILED DESCRIPTION OF THE INVENTION

Figure 1:
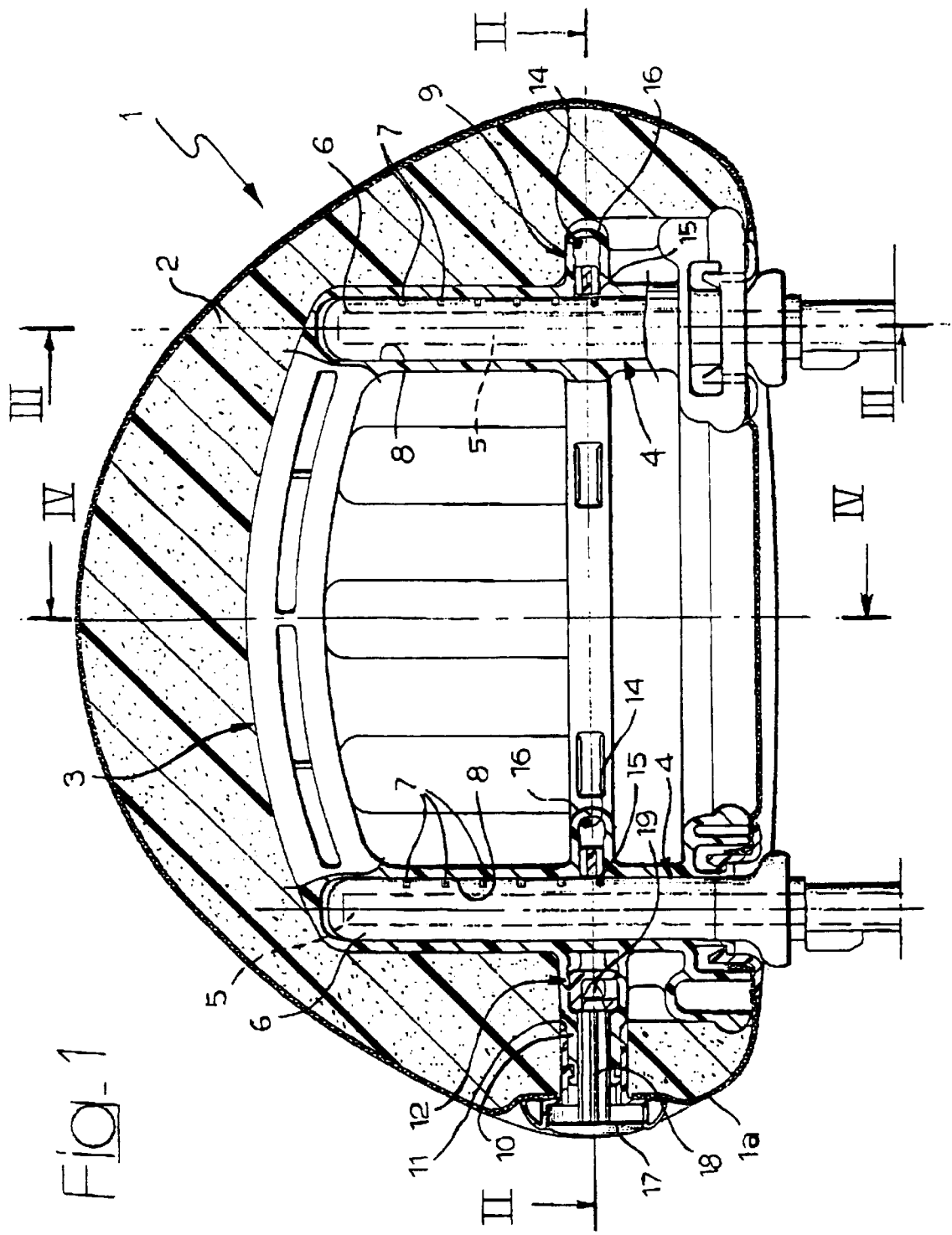
FIG. 1 is a diagrammatic and partially vertically sectioned view of a headrest for motor-vehicle seats according to the invention.

Referring initially to FIGS. 1 through 5, reference numeral 1 generally designates a headrest for motor-vehicles, essentially formed by a yielding body or cushion 2, normally made of foamed plastic material, incorporating a load-bearing framework 3 normally made of rigid moulded plastic material, and a pair of support rods 4 parallel to each other and slidably coupled with the load-bearing framework 3. This coupling enables, in use, adjustment of the height positioning of the cushion 2 relative to the top of the backrest of a motor-vehicle seat on which the headrest 1 is installed.

The rods 4 may be fully metallic or, as in the case of the shown example and in a way known per se, they may comprise a metal core 5 over the upper portion of which a rigid plastic material lining 6 is moulded. In any case, each support rod 4 is provided along one side with a vertical series of positioning notches 7 having preferably a quadrangular cross-section. In the case of the embodiment depicted in FIGS. 1 through 4, the notches 7 of the two support rods 4 are both facing towards the same side of the headrest, i.e. to the right with reference to FIGS. 1 and 2

The support rods 4 are downwardly projecting beneath the yielding body 2 for their connection, in a conventional way, to the bearing structure of the backrest of a motor-vehicle seat. Naturally the rods 4 may be provided, also in a way known per se, with respective articulated joints to enable adjustment of the inclination of the yielding body 2.

Figure 2:
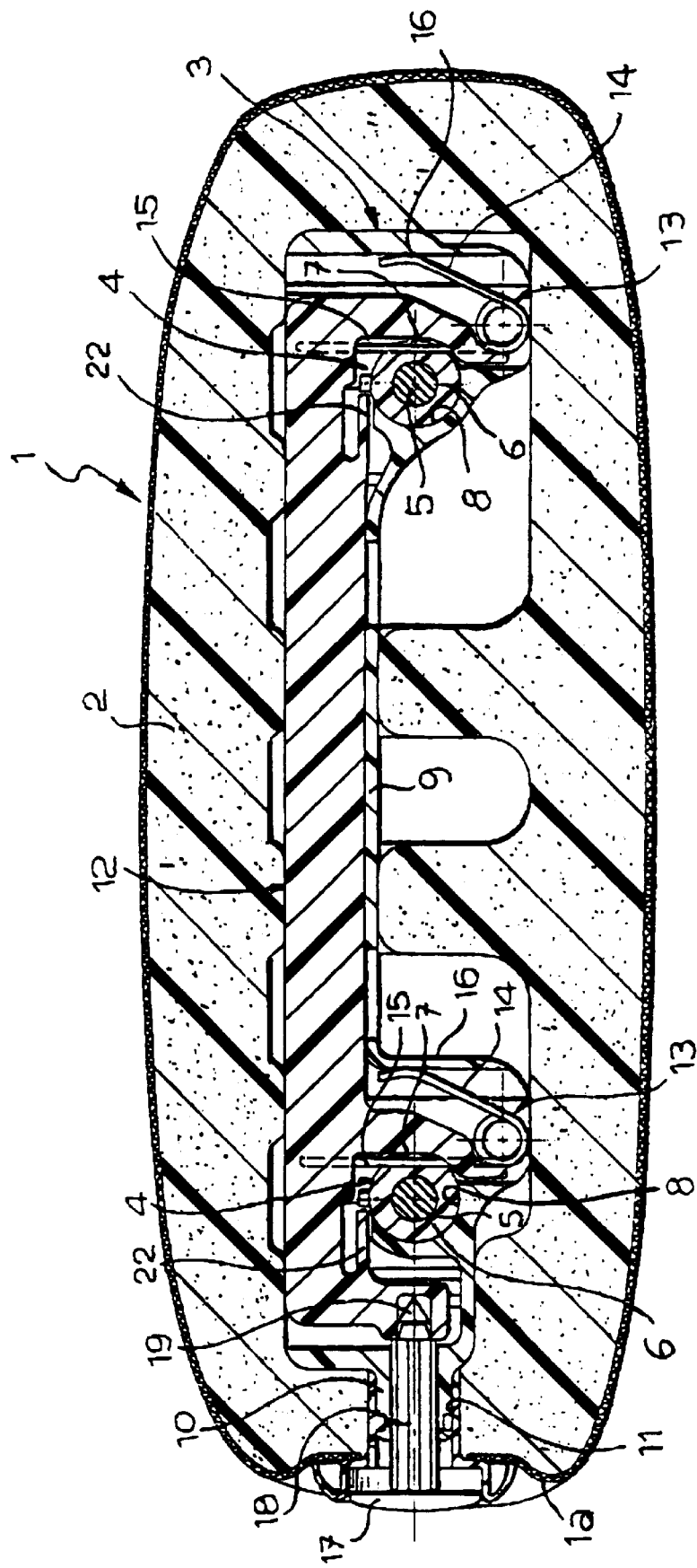
FIG. 2 is a horizontally sectioned view along line II—II of FIG. 1.
Figure 3:
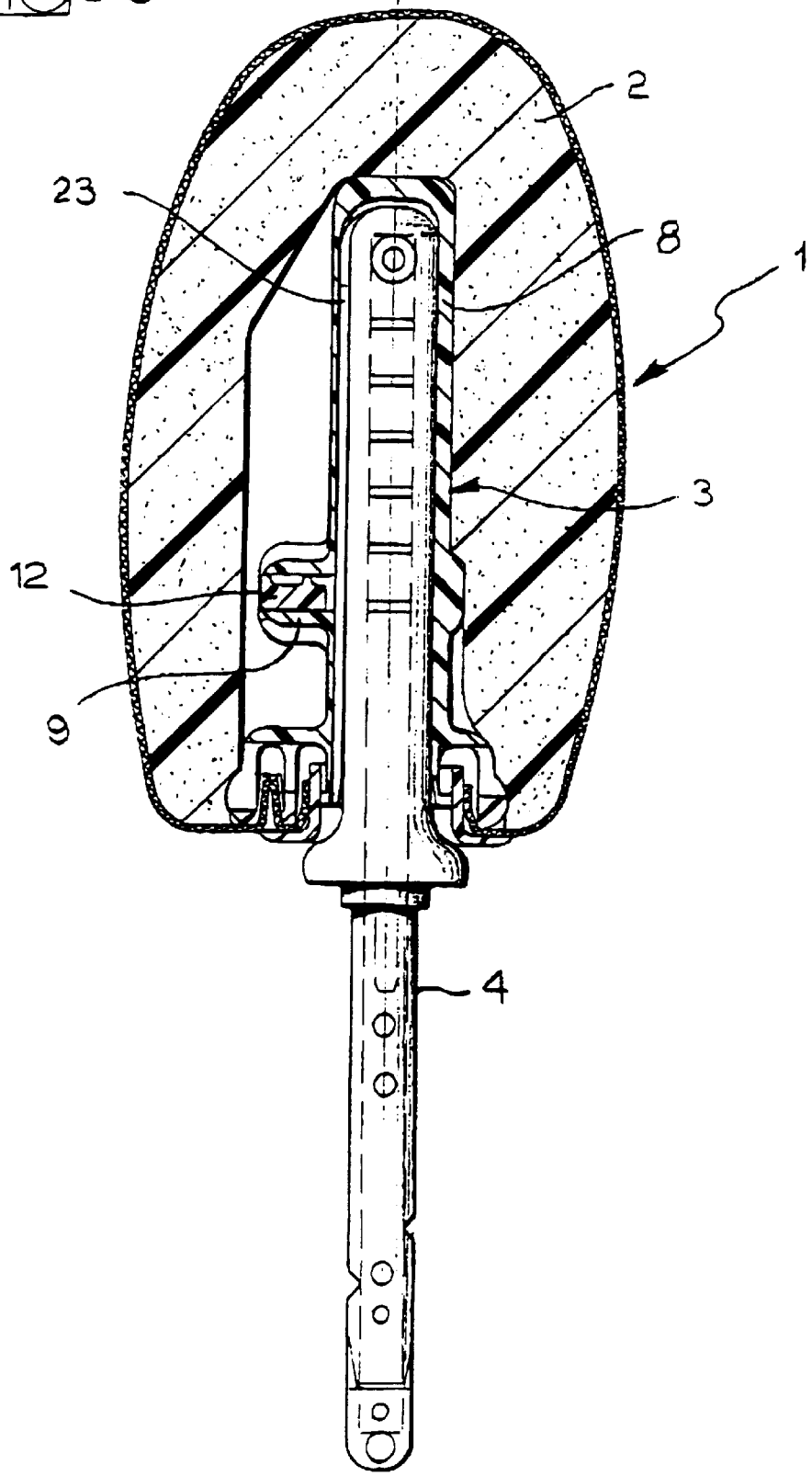
FIG. 3 is a vertically sectioned view along line III—III of FIG. 1.
Figure 4:
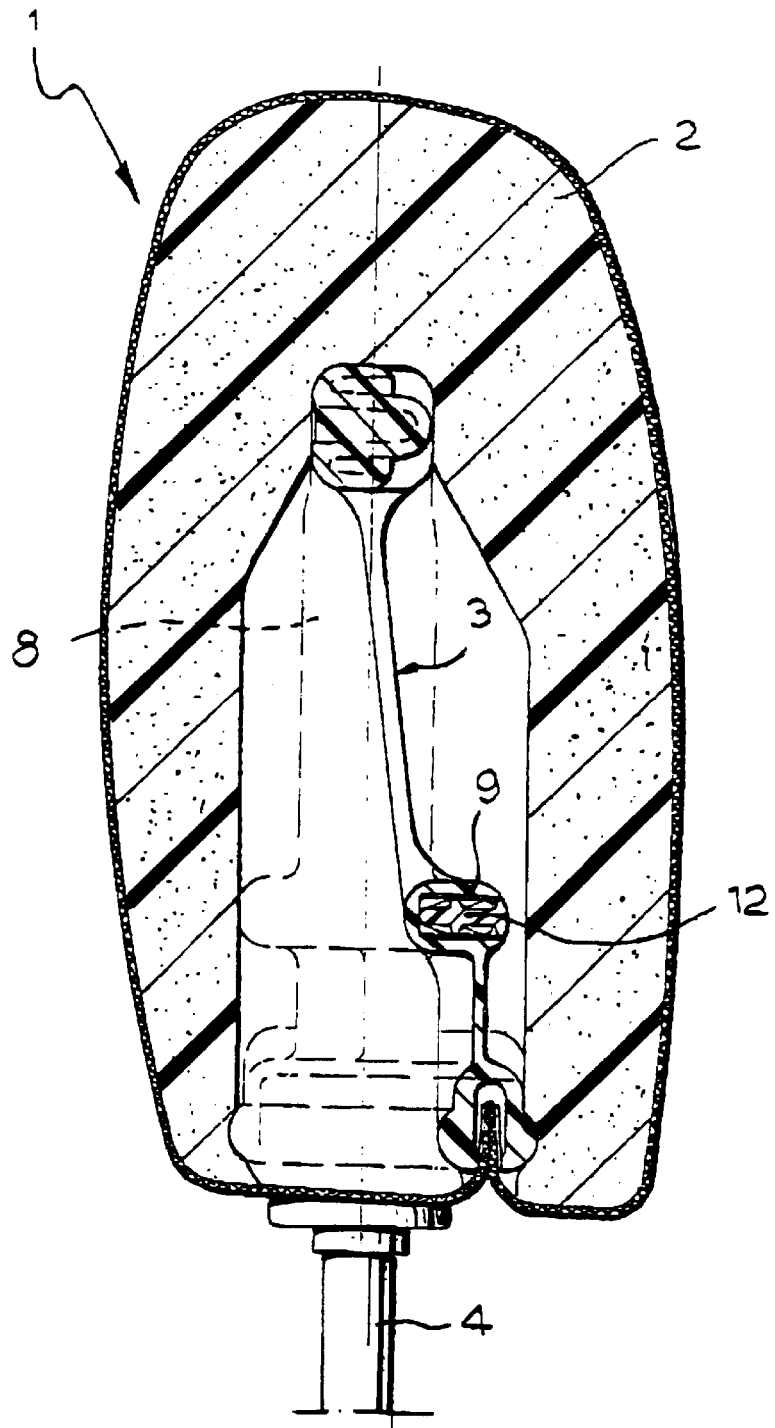
FIG. 4 is a vertically sectioned view along line IV—IV of FIG. 1.

The load-bearing framework 3 is formed, in one piece, with a pair of tubular portions 8 slidably receiving therein the support rods 4, and also with a horizontal housing 9 terminating at one end, i.e. that facing towards the left side 1a of the headrest 1 with reference to FIGS. 1 and 2, with an integral tubular guide appendage 10 which in turn is fitted through a lateral passage 11 of the yielding body 2.

Within the horizontal housing 9 a slider member 12 is arranged, which is formed by one piece of moulded plastic material and is movable perpendicularly to the support rods 4, in the way which shall be clarified herebelow.

Reference numerals 13 designate two metal wire or clip V-shaped springs each of which has a springing arm 14 reacting against a corresponding reaction surface 16 of the housing 9 of the load-bearing framework 3, and an arm 15 which is rigidly secured into the slider member 12, with a central portion of the arm 15 being exposed such as depicted in FIG. 2.

The above exposed central portions of the arms 15 are normally extending through the tubular portions 8 of the load-bearing framework 3, and are adapted to engage the notches 7 of the two support rods 4 such as clarified in the following.

The springing branches 14 of the two wire springs 13 act as resilient thrust members urging the slider member 12 into the engaged position shown in the drawings, in which same is displaced to the left with reference to FIGS. 1 and 2 in such a way that the arms 15 engage corresponding notches 7 of the support rods 4, thus preventing relative sliding between the load-bearing framework 3 with the yielding body 2 and the support rods 4 of the headrest 1.

Reference numeral 17 designates a control member formed as a manually operable push-button arranged at one side 1a of the headrest 1 and rigidly connected to a stem 18, which in turn is axially slidable along the tubular appendage 10 of the housing 9 and is rigidly secured at 19 to the slider member 12.

The control push-button 17 can be operated from outside to displace the slider member 12 from the engaged position shown in the drawings towards a disengaged position in which same is moved to the right with reference to FIGS. 1 and 2, against the action of the springing branches 14 of the wire springs 13. Owing to this displacement the locking arms 15 are withdrawn from the notches 7 of the support rods 4, whereby in use the yielding body 2 can be moved upwardly or downwardly, by virtue of sliding of the tubular portions 8 of the load-bearing framework 3 along the support rods 4, to perform height adjustment relative to the backrest of a motor-vehicle seat. Upon release of the control push-button 17, the springing branches 14 of the wire springs 13 move the slider member 12 back to its initial position in which the arms 15 shall engage corresponding positioning notches 7 of the support rods 4.

It will be apparent from the foregoing that locking and unlocking operation between the yielding body 2 and the support rods 4, and accordingly height adjustment operation of the yielding body 2, are made extremely easy and convenient. Moreover, due to the fact that the wire springs 13 simultaneously act both as locking members (through the respective arms 15) and as resilient thrust members (through the respective springing branches 14), the construction of the locking and release mechanism of the headrest according to the invention is made particularly simple and economical, but at the same time sturdy.

Reference numerals 22 designate two resilient stop teeth integrally formed with the slider member 12 and whose function is to prevent full withdrawal of the support rods 4 relative to the load-bearing framework 3. Upon mounting of the support rods 4 into the tubular portions 8 of the load-bearing framework 3, the resilient teeth 22 snap engage beneath corresponding upper projections 23 (FIG. 3) of the support rods 4. Following assembling, in the fully raised condition of the yielding body 2 along the support rods 4, the stop teeth 22 abut against the projections 23.

Figure 5:
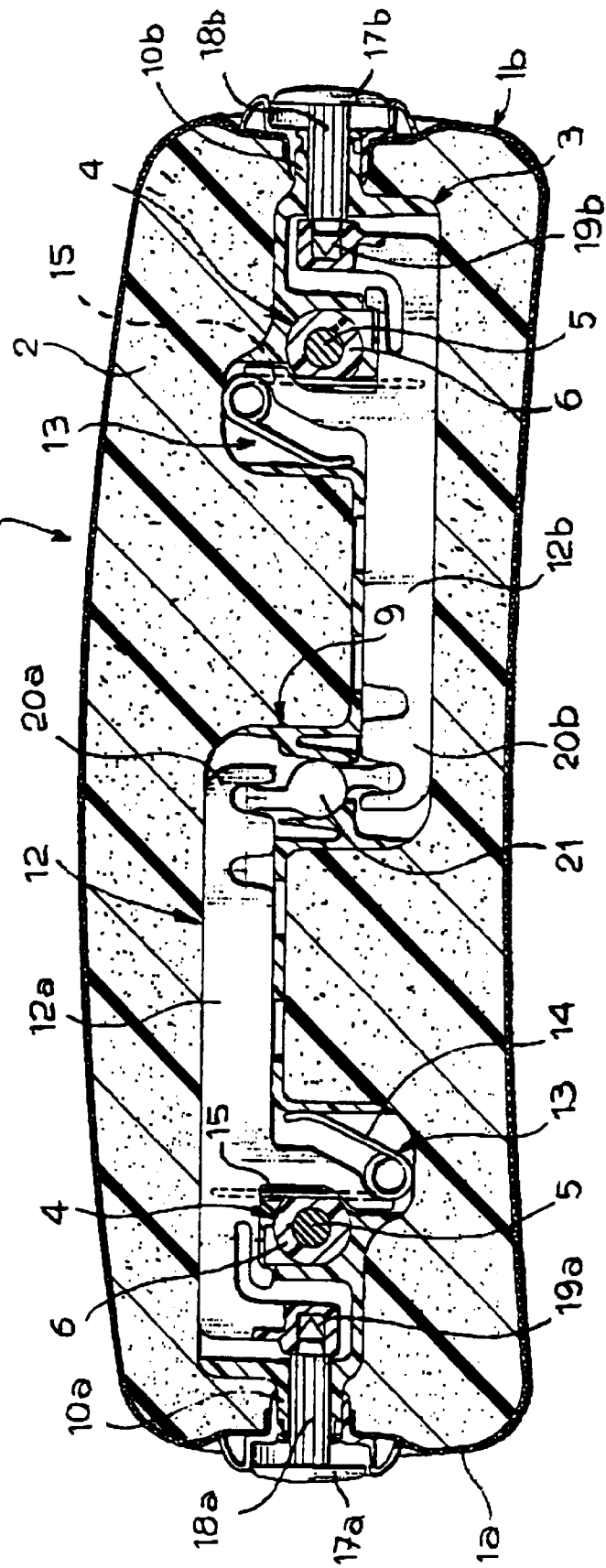
FIG. 5 shows a variant of FIG. 2.

FIG. 5 shows an alternative embodiment of the invention in which, instead of one single control push-button 17, two control push-buttons 17a, 17b are provided, which are arranged at the opposite sides 1a, 1b of the headrest 1. This arrangement may be more convenient than that previously disclosed with reference to FIGS. 1 through 4, since it enables employing the headrest according to the invention indifferently for both right and left motor-vehicle seats, making available in either case a control push-button (each time the push-button 17a or the push-button 17b) facing towards the outer side of the vehicle for a more easy and convenient operation thereof by the user.

In this variant the slider member 12, instead of being formed by one single piece, is comprised of two distinct portions 12a, 12b, each of which is connected at 19a, 19b to the respective push-button 17a, 17b. In correspondence of the respective inner ends 20a, 20b the two slider portions 12a, 12b are connected to each other by a reversing mechanism 21, through which displacement of one slider portion 12a, 12b in one direction, operated by means of the respective control push-button 17a, 17b, corresponds to a same displacement of the other slider portion 12b, 12a in the opposite direction. The reversing mechanism 21 can be constituted, as in the case of the illustrated example, by a dual-fit rocker element swingably supported within the housing 9 of the load-bearing framework 3, or by any other functionally equivalent mechanism (for instance a rack-and-pinion system or the like).

The arrangement and the function of the two wire springs 13 are same as those of the embodiment previously disclosed, with the only difference related to the fact that their location is specularly opposite: namely, since in this case the positioning notches 7 of the two support rods 4 are juxtaposed to one another, the locking arms 15 are facing towards the sides 1a, 1b of the headrest 1, respectively, while the springing branches 14 are facing inwardly.

Moreover each slider portion 12a, 12b is formed with a respective tubular appendage 10a, 10b for the stem 18a, 18b of the respective control push-button 17a, 17b.

Naturally the details of construction and the embodiments may be widely varied with respect to what has been disclosed and illustrated, without thereby departing from the scope of the present invention, such as defined in the appended claims.

What is claimed is:

1. Headrest for motor-vehicle seat, comprising:

a) a resilient body including an internally located load-bearing framework;

b) a pair of parallel support rods slidably coupled within said load-bearing framework and extending outside said resilient body, said support rods including positioning notches;

c) lock mechanism to engage corresponding said positioning notches to prevent relative displacement between said rods and said load-bearing framework;

d) said lock mechanism including a pair of arms arranged transversely of said support rods;

e) a member carrying said arms and slidable within said load-bearing framework in a direction perpendicular to said support rods and said arms between an engaged position and a disengaged position of said arms relative to said positioning notches;

f) a spring to urge said member towards said engaged position; and g) a release mechanism including one push-button arranged at one side of said resilient body and operable from outside of said resilient body to displace said member from said engaged position to said disengaged position against said resilient thrust.

2. Headrest as in claim 1, wherein said spring comprises first and second springs, each being formed in one piece with respective said arms.

3. Headrest as in claim 2, wherein said spring comprises a pair of wire springs, each having a first branch reacting against said load-bearing framework and a second branch constituting one of said arms.

4. Headrest as in claim 1, wherein:
   a) said load-bearing framework has an integral housing; and
   b) said member is disposed within said housing.

5. Headrest as in claim 1, wherein said load-bearing framework has at least one lateral integral tubular guide appendage connected to said push-button.

6. Headrest as in claim 1, wherein said member is formed with a pair of resilient stop teeth to prevent full withdrawal of said support rods relative to said load-bearing framework.

7. Headrest as in claim 1, wherein said member is formed in one single piece.

8. Headrest as in claim 1, wherein said release mechanism comprises another push-button provided at an opposite side of said resilient body.

9. Headrest as in claim 8, wherein:
   a) said member is formed by two mutually displaceable portions, each being connected to a respective one of said push-buttons; and
   b) said portions are connected to each other by a reversing mechanism, whereby displacement of one of said portions in one direction, operated through respective said push-buttons, corresponds to a same displacement of the other portion in an opposite direction.

* * * * *